Dec. 5, 1933.　　　A. E. DEMPSEY, JR　　　1,938,218
COMPRESSOR VALVE
Filed June 8, 1931　　　2 Sheets-Sheet 1

INVENTOR.
Arthur E. Dempsey Jr.
BY
ATTORNEY.

Dec. 5, 1933.  A. E. DEMPSEY, JR  1,938,218
COMPRESSOR VALVE
Filed June 8, 1931    2 Sheets-Sheet 2
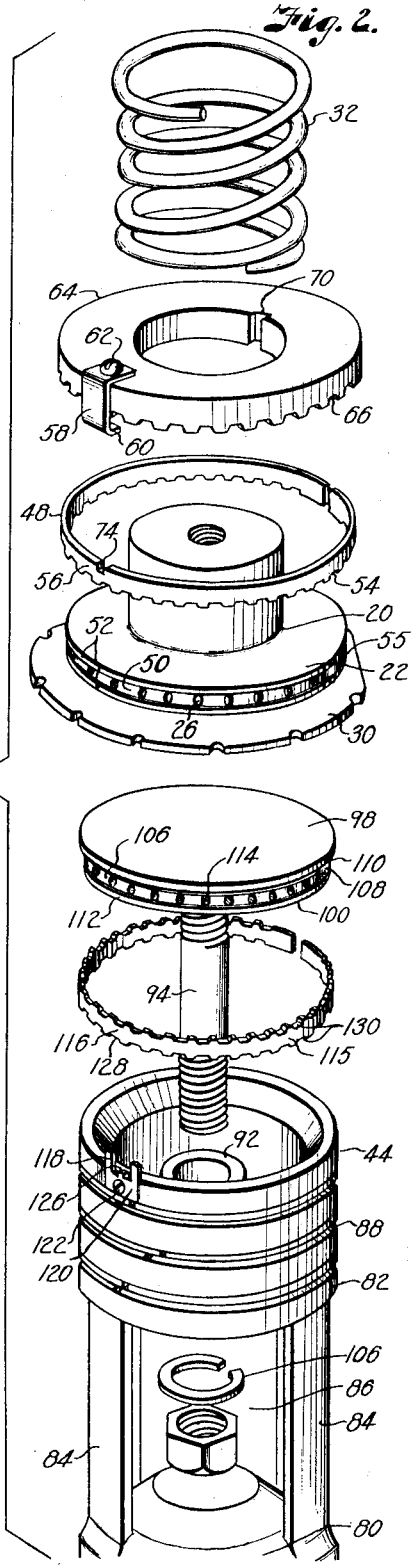
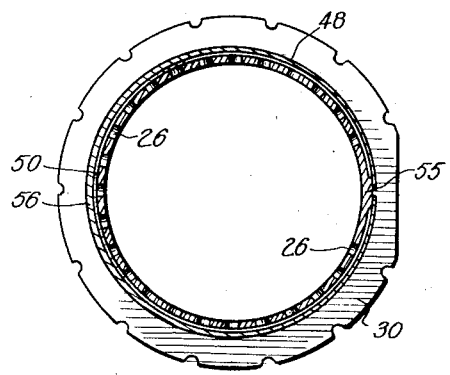
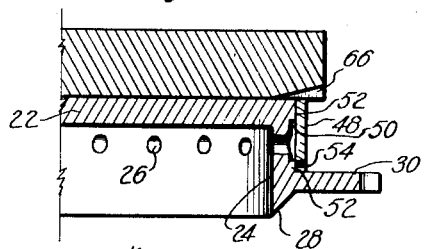
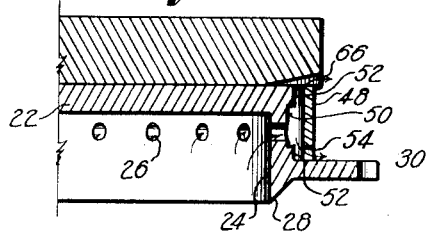
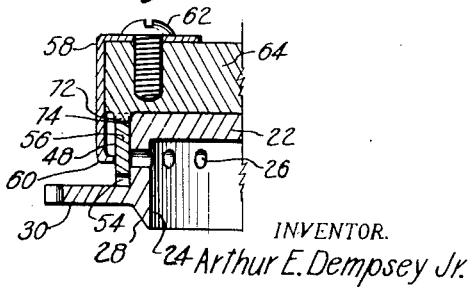
INVENTOR.
Arthur E. Dempsey Jr.
BY Arthur L. Brown
ATTORNEY.

Patented Dec. 5, 1933

1,938,218

UNITED STATES PATENT OFFICE 1,938,218

COMPRESSOR VALVE

Arthur E. Dempsey, Jr., Council Bluffs, Iowa, assignor to Baker Ice Machine Co. Inc., Omaha, Nebr., a corporation of Nebraska Application June 8, 1931. Serial No. 542,809

8 Claims. (Cl. 230—230)

This invention relates to compressors and more particularly to valve mechanisms for controlling movement of fluid into and from a compression chamber.

In some situations, for example in ammonia compression work, desirable high speed has heretofore been obtainable only with mechanically operated valves, and low or high speed valves are ordinarily noisy and wear out quickly due to collision of parts of poppet and like valves.

The principal objects of this invention are to reduce collisional effects in valve mechanisms and to simplify the construction and operation of valves of this character.

Further objects of the invention are to substantially reduce sliding friction of valve parts, and to employ valves having resilient qualities, whereby the use of auxiliary springs for retracting valves may be obviated, thus reducing lubrication requirements and permitting the use of higher speeds without auxiliary mechanical means for operating the valves.

Other objects of the invention will be apparent in the course of the following description of one form of apparatus embodying the invention and illustrated in the accompanying drawings, wherein:

Fig. 2 is a perspective view of suction and discharge valve mechanisms removed from the cylinder, the members being shown in disassembled and spaced, but properly related positions, except that the circular valve seat member of the lower mechanism is slightly displaced to show a groove partition.

Fig. 3 is a transverse section through the center of an apertured annular valve seat on the line 3—3, Fig. 1, illustrating the relation of a split band valve to the seat.

Fig. 4 is an enlarged fragmentary vertical section of an edge portion of the valve mechanism on the discharge end of the cylinder in Fig. 1, showing the band valve closing the ports in the annular valve seat.

Fig. 5 is a similar fragmentary section of the portion of the discharge valve mechanism shown in Fig. 4, illustrating the band valve spaced from the annular seat by pressure of fluid from the cylinder and permitting escape of gas through notches in the lower edge of the valve and through notches in retainer plate at upper edge of valve.

Fig. 6 is a fragmentary vertical section of a portion of the assembled discharge valve mechanism at the left side of Fig. 1, illustrating means latching the band valve in port-controlling position.

Figure 1:
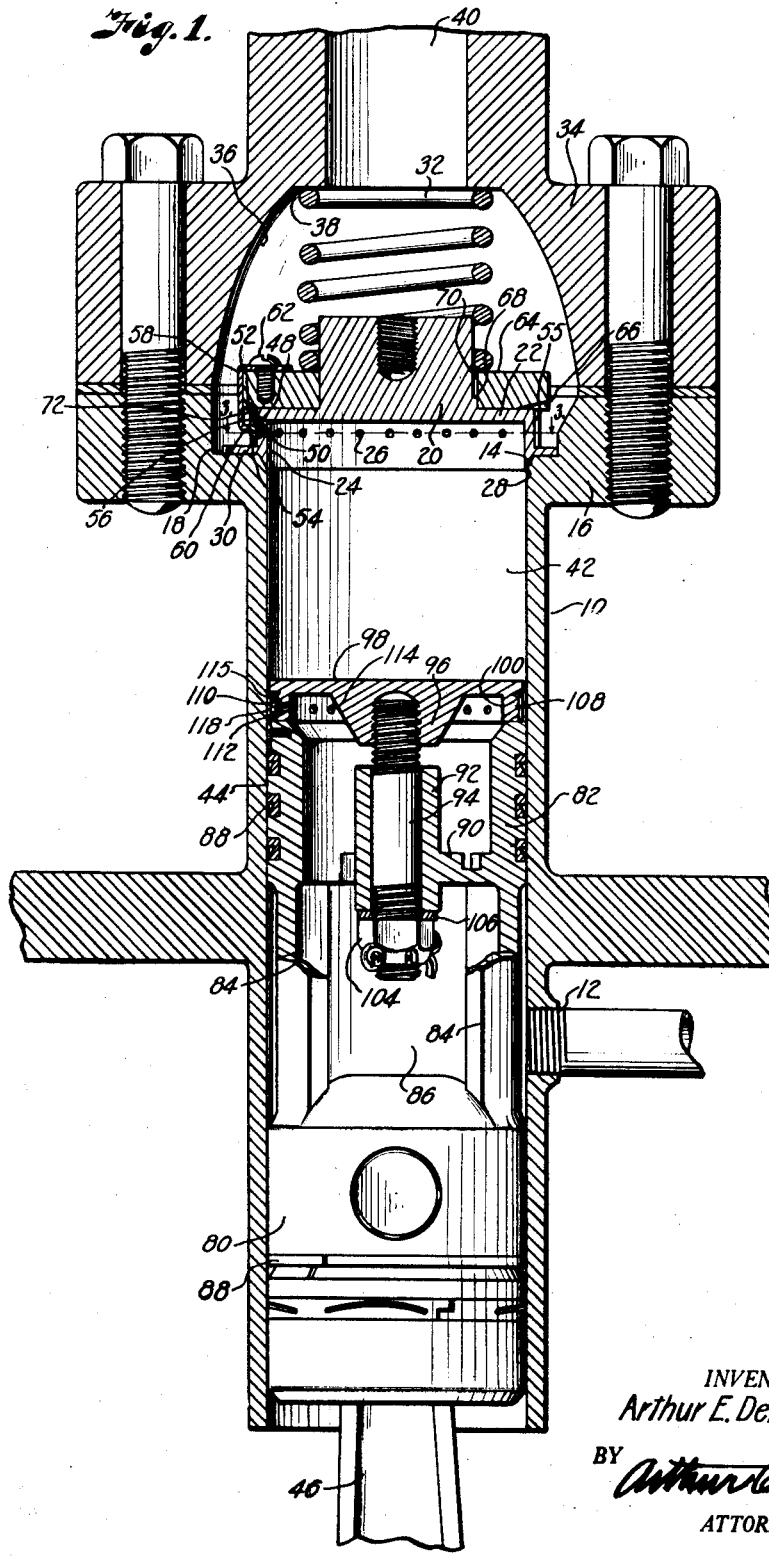
Fig. 1 is a longitudinal section through a compressor cylinder and adjacent parts illustrating valve mechanism constructed in accordance with the invention.

Referring more in detail to the drawings:

10 designates a cylinder having a side inlet 12 and a discharge end provided with a tapered seat 14 and a radial flange 16 forming a ledge or seat 18 at the end edge of the cylinder.

A discharge valve mechanism includes a body 20 and a disk portion 22 provided with a peripheral edge skirt 24 having ports 26 and a beveled end edge 28 mounted on said seat 14 to register the inner periphery of the skirt with the inner periphery of the cylinder.

A radial flange 30 at the inner edge of the beveled margin of the skirt seats on the ledge 18, and a coil spring 32 mounted on the body 20 bears against a head 34 removably secured to the cylinder flange 16. The head has a recess formed by an arcuate surface or wall 36 having a lower edge portion registering with the inner periphery of the upstanding portion of the cylinder flange and curved upwardly inwardly to terminate in a transverse seat 38 for the spring. A discharge channel 40 at the inner edge of the spring seat is formed on the extended axis of the cylinder bore, both channel and cylinder bore being preferably cylindrical.

Gas admitted to the cylinder through the inlet 12 is admitted to and compressed in the discharge end portion or compression chamber 42 of the cylinder by a piston 44 operated by suitable apparatus, not shown, through a connecting rod 46 projecting from the opposite open end of the cylinder and later described in detail.

The spring 32 retains the flange 30 and tapered skirt edge firmly against the end of the cylinder to close the same in opposition to normal pressure of gas compressed by the piston, and compressed gas is discharged through the ports 26.

The ports 26 comprise an annular series of apertures formed in the skirt between the disk 22 and flange 30 and are directed laterally transversely to the axis of the cylinder into the annular chamber surrounding the valve mechanism, and are controlled by a band-like valve 48 as presently described.

An annular groove 50 formed in the skirt and disk provides spaced continuous ring seats 52, as particularly well shown in Fig. 2, at opposite sides of the series of ports. The valve 48 comprises a split ring formed of resilient material forming a shutter-like cover over the ports, and adapted to be held by its own compression snugly against the seats to close the groove and prevent outflow of gas that passes into the groove through the ports 26 from the cylinder. The lower edge of the band seats snugly and slidably on the flange 30, and is provided with notches 54 through which gas may pass from the groove to the head.

A boss-like partition 55 in the groove forms a surface flush with the seats 52 to support the free ends of the valve as shown in Fig. 3.

The spring-like valve band increases in thickness from the ends to the center portion 56 thereof, the end portions being thin. A clip 58 connected to the head has a lip 60 engaging the thickened portion of the band to retain the band in port covering position and also to require successive expansion of band portions from the thin ends to the thicker center for permitting gas to flow from the cylinder.

The clip is preferably mounted by a screw 62 on a ring 64 slidable on the cylindrical portion of the body 20 as shown, to engage the disk 22, and is retained on the disk by the spring 32. The inner face of the ring 64 is provided with a series of tapered notches 66 which cut the outer edge of the ring and provide a plurality of apertures through which gas may pass over the adjacent edge of the valve 48 into the annular space between the valve mechanism and the head when the valve is expanded, as best shown in Fig. 5.

In order to latch the ring 64 and valve 48 in functioning position, a radial lug 68 projects from the body 20 to engage in a notch 70 in the inner periphery of the ring 64, as shown best respectively in Figs. 1 and 2. A pin 72 projecting from the inner face of the ring 64 beneath and adjacent the latching clip 58 as shown in Figs. 1 and 6, may engage in a notch 74 formed in the upper edge of the thickest portion of the valve 48, shown best in Fig. 2.

The valve 48 has slight play on the pin and thus circumferential movement of the valve over the annular seat is limited.

Attention is called to the substantially equal height or width of the portion of the skirt and disk 22 above the flange 30, and the valve 48, the valve having very slightly less width than the same, whereby the relatively light valve may expand and contract without substantial frictional engagement with either the supporting flange 30 or the retaining ring 64.

The piston includes a head portion 80 and a hollow tubular portion 82 connected to the head by legs 84 to form ports 86 through which gas may be admitted from the inlet 12 to the piston. Each piston portion is provided with valve rings 88 operating in grooves in the periphery of the piston.

The piston is provided with a spider 90 in the hollow portion 82 supporting a tubular guide 92 in which a bolt 94 is freely slidable, for retaining on the piston an annular valve seat of valve mechanism similar to the discharge valve mechanism, as will now be described.

Threaded on one end of the bolt is a boss 96 at the center of a plate or disk 98 having an annular apertured skirt or ring-like flange 100 inset from the periphery of the disk to form an annular chamber between the skirt and the wall of the cylinder bore. The free edge of the skirt snugly seats on the end edge of the piston inwardly from the periphery of the piston and at the outer margin of a beveled outlet end of the piston bore as clearly shown in Fig. 1.

A nut 104 is threaded on the opposite end of the bolt to urge a lock washer 106 against the end of the spider tube 90 and resiliently hold the disk skirt in sealing engagement with the end edge face of the piston.

The skirt has an external annular discontinuous groove 106 in which is a spacing partition or boss 108 clearly shown in Fig. 2, and forming continuous ring seats 110 and 112 on opposite sides of the annular series of ports 114 in the skirt.

Mounted on the skirt to cover the groove is a resilient band or split ring valve 115 having relatively thin ends resting against the partition 108. The valve increases in thickness from each end toward its middle portion 116, which is latched to the skirt by fingers or prongs 118 of a plate 120 fixed by a screw 122 in a socket formed in the periphery of the ring-like discharge end portion of the piston defined by the uppermost piston ring groove.

A lug 126 projecting from the end edge of the piston and preferably formed on the plate 120 between the prongs is engageable in a notch 128 in one edge of the thickest portion of the valve. The lug limiting the circumferential movement of the valve, the prongs are thus adapted to engage the thickest portion of the valve.

The opposite edges of the valve may move relatively freely across the end face of the piston and the disk, and are provided with series of notches 130 to permit gas to flow freely through the notches at both sides of the valve into the compression chamber on retractive movement of the piston which tends to produce a vacuum in the chamber and pressure in the piston.

The diameter of the disk 98 is materially less than the diameter of the cylinder bore, so that gas may move freely past the edge of the disk into the compression chamber.

Attention is called to the extension of the compression chamber produced by the skirt of the discharge valve mechanism, whereby the piston and particularly the valve mechanism on the piston may move into the discharge valve mechanism at the end of the discharge stroke of the piston. The piston valve ports may thus be located substantially in the plane of the discharge valve ports at the end of the discharge stroke, due to the telescoping relation between the two valve mechanisms.

In using the device upon discharge stroke of the piston, gas in the compression chamber is compressed and moved through the ports of the discharge valve mechanism, expanding the valve away from the spaced annular seats, and moving into and through the head. The pressure in the chamber, and reduced pressure in the piston, permit the piston valve to close the groove and ports in the piston.

Upon retractive stroke of the piston, reduced pressure or suction in the compression chamber permits the discharge valve to close the groove and ports, and pressure in the piston cooperating with suction effects expansion of the piston valve to bring about filling of the compression chamber with gas.

The thin end portions of the split band valves respond first to pressure and successive portions of the valves are moved away from the seats. The thickest portions of the valves are held against the seats. When a valve is open the distance between the valve and its seat gradually decreases from the ends to the center. A rolling action of the valve on the seat is thus produced, and there will be no decided collision between the valve and its seat.

The valves are never raised a great distance from the seats, because of the lengths of the ports and the availability of both sides of the port for passage of gas.

Very high operating speed is possible because of the light parts, small travel and large area, and also because of the necessary spring action being incorporated in the valve itself instead of having a separate spring with its inertia effect complicating, or even defeating the high speed action, proper spring action being as important as lightness of parts in high speed automatic valves.

Since there is but very little sliding action at any point, no lubrication is needed. The very little sliding done by the band circumferentially is intended to keep the seats in first class polished condition so that no grinding should be necessary at any time.

What I claim and desire to secure by Letters Patent is:

1. In a device of the character described, a valve seat member including an apertured cylindrical wall, a valve comprising a split ring increasing in thickness from the ends to the center thereof located on said wall in covering relation with the apertures therein, and means engaging the thickest portion of the ring for retaining said portion in engagement with the wall.

2. In apparatus of the character described, a valve seat member including an annulus provided with a peripheral groove, and having ports in the bottom of the groove, and a valve ring having guided edge contact with opposite sides of the groove in the annulus to cover the groove and provided with notches to allow flow past the ring from the ports.

3. In combination with a hollow piston, a valve seat member closing one end of the piston and including an annular wall having a port directed transversely to the axis of the cylinder, a flat metal band normally engaging said wall to close the port and movable therefrom, and means for guiding said band to and from closing relation with said port, means for preventing rotation of the band in port closing position.

4. In combination with a hollow piston, a valve seat member including a disk having less diameter than the end of the piston and an inset annulus depending from the disk provided with a peripheral groove and having ports in the bottom of the groove, a split resilient ring having substantially the same width as the annulus, mounted on the annulus and having notches in its upper and lower edges, and means for retaining the ring on the piston.

5. In combination with a piston including a hollow body having an open outlet end, a valve seat member closing the outlet end of the piston having an inset wall engageable with the end edge of the piston and provided with ports, an expansible band mounted on said wall to normally cover the ports, yieldable to pressure of fluid moving through the ports from the interior of the piston and having edge notches for passage of fluid, a lug on the piston engageable in one of the edge notches of said band for latching the valve in selected position on the wall, and means for securing the valve seat member to the piston for locating the opposite edges of said valve in guided engagement with the end edge of the piston and said disk respectively.

6. In combination with a valve seat member including an imperforate disk having a skirt-like cylindrical wall provided with a plurality of ports, a radial flange on said skirt below said ports, a split resilient band movably mounted on said wall and having a notched lower edge slidably engaging said flange, and a disk-like latching member having a lower face engaging said disk for retaining the band on the cylindrical wall and having grooves for passing gas over the upper edge of said band, and a latch on said latching member engageable with the center portion of said band for limiting movement of the band responsive to passage of fluid through said ports.

7. In a device of the character described, a valve body having an annulus provided with radially extending ports for the passage of fluid, a flat spring band encircling the annulus and yieldingly closing said ports and provided with notches for passing the fluid from the ports when the band is unseated, and means associated with the body member and engaging opposite side edges of the band for preventing longitudinal movement of the band relatively to the axis of said annulus.

8. In apparatus of the character described including a cylinder, a valve body member closing an end of the cylinder and having a plurality of radially extending ports, a flat band encircling the valve member and normally closing said ports, a member slidably mounted on the valve member for cooperating with the valve member to prevent longitudinal movement of said band in movement to and from closing position relatively to said ports, and means yieldingly retaining said member and the body member in functional position.

ARTHUR E. DEMPSEY, Jr.